(12) United States Patent
Silverbrook

(10) Patent No.: US 8,109,611 B2
(45) Date of Patent: *Feb. 7, 2012

(54) TRANSLATION TO ROTATION CONVERSION IN AN INKJET PRINTHEAD

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 2046 days.

This patent is subject to a terminal disclaimer.

(21) Appl. No.: 10/509,997

(22) PCT Filed: Aug. 29, 2002

(86) PCT No.: PCT/AU02/01166
§ 371 (c)(1),
(2), (4) Date: Oct. 5, 2004

(87) PCT Pub. No.: WO03/091029
PCT Pub. Date: Nov. 6, 2003

(65) Prior Publication Data
US 2011/0205300 A1    Aug. 25, 2011

(51) Int. Cl.
*B41J 2/04* (2006.01)
(52) U.S. Cl. ............... 347/54; 347/66; 347/69; 347/70; 347/71; 347/20
(58) Field of Classification Search .................. 347/54, 347/63, 68–72, 20
See application file for complete search history.

(56) References Cited

U.S. PATENT DOCUMENTS

| 4,423,401 A | 12/1983 | Mueller |
| 4,553,393 A | 11/1985 | Ruoff |
| 4,672,398 A | 6/1987 | Kuwabara et al. |
| 4,737,802 A | 4/1988 | Mielke |
| 4,864,824 A | 9/1989 | Gabriel et al. |
| 5,029,805 A | 7/1991 | Albarda et al. |
| 5,258,774 A | 11/1993 | Rogers |
| 5,666,141 A | 9/1997 | Matoba et al. |
| 5,719,604 A | 2/1998 | Inui et al. |
| 6,070,967 A | 6/2000 | Bern |
| 6,299,290 B1 | 10/2001 | Silverbrook |
| 6,527,374 B2 * | 3/2003 | Silverbrook .................... 347/54 |

FOREIGN PATENT DOCUMENTS

| DE | 1 648 322 | 3/1971 |
| DE | 29 05 063 | 8/1980 |
| DE | 32 45 283 | 6/1984 |

(Continued)

OTHER PUBLICATIONS

Noworolski, J. Mark et al, "Process for in-plane and out-of-plane single-crystal-silicon thermal microactuators". Sensors and Actuators, A, CH, Elsevier Sequoia S.A., Lausanne, vol. 55, No. 1, Jul. 15, 1996, pp. 65-69, XP004077979 ISSN: 0924-4247.

(Continued)

*Primary Examiner* — Matthew Luu
*Assistant Examiner* — Henok Legesse

(57) ABSTRACT

An inkjet printhead with a plurality of nozzle arrangements that each have a nozzle chamber and an ink ejection port that is in fluid communication with the nozzle chamber. The nozzle arrangements also have an actuator configured for rectilinear movement, and an ink-ejecting mechanism configured for angular displacement to eject ink from the ink ejection port. A translation to rotation conversion mechanism is interposed between the actuator and the ink-ejecting mechanism to convert rectilinear movement of the actuator into angular displacement of the ink-ejecting mechanism.

11 Claims, 4 Drawing Sheets

FOREIGN PATENT DOCUMENTS

| | | |
|---|---|---|
| DE | 34 30 155 | 2/1986 |
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0 634 273 | 1/1995 |
| EP | 0 713 774 | 5/1996 |
| EP | 0 737 580 | 10/1996 |
| EP | 0 750 993 | 1/1997 |
| EP | 540338 | 1/1998 |
| EP | 0 882 590 | 12/1998 |
| EP | 899684 | 3/1999 |
| EP | 940975 | 9/1999 |
| FR | 2 231 076 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 2-265752 | 10/1990 |
| JP | 03 653348 | 3/1991 |
| JP | 03 112662 | 5/1991 |
| JP | 03 180350 | 8/1991 |
| JP | 40 4001051 | 1/1992 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05 28765 | 10/1993 |
| JP | 05 318724 | 12/1993 |
| JP | 6-91865 | 4/1994 |
| JP | 6-91866 | 4/1994 |
| JP | 07 314665 | 12/1995 |
| WO | WO 94 18010 | 8/1994 |
| WO | WO 97 12689 | 4/1997 |

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157.

Yamagata, Yutaka et al, "A Micro Mobile Mechanism Using Thermal Expansion and its Theorectical Analysis". Proceeding of the workshop on micro electro mechanical systems (MEMS), US, New York, IEEE, vol. Workshop 7, Jan. 25, 1994, pp. 142-147, XP000528408, ISBN: 0-7803-1834-X.

Derwent Abstract Accession No. 2001-020348/03, JP 2000-293335 A (Seiko Epson Corportation) Oct. 20, 2000.

Derwent Abstract Accession No. 98-081618/08, JP 09-314915 A (Canon Kabushiki Kaisha) Dec. 9, 1997.

* cited by examiner

TRANSLATION TO ROTATION CONVERSION IN AN INKJET PRINTHEAD

FIELD OF THE INVENTION

This invention relates to an ink jet printhead chip. More particularly, this invention relates to an inkjet printhead chip that includes a motion conversion mechanism.

BACKGROUND OF THE INVENTION

As set out in the above referenced applications/patents, the Applicant has spent a substantial amount of time and effort in developing printheads that incorporate micro electro-mechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

Common to most of the printhead chips that the Applicant has developed is a component that moves with respect to a substrate to eject ink from a nozzle chamber. This component can be in the form of an ink-ejecting member that is displaceable in a nozzle chamber to eject the ink from the nozzle chamber.

As is also clear from the above applications, Applicant has developed a number of ways in which to achieve the ejection of ink from the respective nozzle chambers. A majority of these are based on the selection of a material having a coefficient of thermal expansion that is such that, on a MEMS scale, expansion upon heating and subsequent contraction upon cooling can be harnessed to perform work. The material is formed to define at least part of a thermal actuator that includes a heating circuit. The heating circuit is shaped to be resistively heated when a current passes through the circuit. The current is supplied to the circuit in the form of pulses at a frequency that depends on the printing requirements. The pulses are usually supplied from a CMOS layer positioned on a substrate of the printhead chip. The pulses are shaped and have a magnitude that is also dependent on the printing requirements. The generation and control of the pulses is by way of a suitable microprocessor of the type described in the above referenced applications.

On a macroscopic scale, it is counter-intuitive to use the expansion and subsequent contraction of material in order to achieve the performance of work. Applicant submits that the perceived slow rate of expansion and contraction would lead a person of ordinary skill in the field of macroscopic engineering to seek alternative energy sources.

On a MEMS scale, however, Applicant has found that expansion and contraction of such a material can be harnessed to perform work. The reason for this is that, on this scale, expansion and contraction are relatively rapid and can transmit relatively high force.

There remains an issue of range of movement. While the expansion and contraction are both rapid and forceful, Applicant has found that it would be desirable for a mechanism to be provided whereby such rapidity and force of movement could be amplified at a region where the work is required to eject the ink.

A majority of the nozzle arrangements covered by the above applications and patents use differential expansion in the thermal actuator to achieve bending of the thermal actuator. This bending movement is transmitted to an ink-ejecting component that is either rectilinearly or angularly displaced to eject the ink.

Applicant has found that it would be desirable for simple rectilinear expansion of a thermal actuator to be transmitted to an ink-ejecting component, since such simple rectilinear expansion on a MEMS scale is relatively efficient.

The Applicant has conceived this invention in order to achieve the desired transmission and amplification of motion mentioned above.

SUMMARY OF THE INVENTION

According to the invention, there is provided a printhead chip for an inkjet printhead, the printhead chip comprising
 a substrate; and
 a plurality of nozzle arrangements that is positioned on the substrate, each nozzle arrangement comprising
  nozzle chamber walls and a roof that define a nozzle chamber with the roof defining an ink ejection port that is in fluid communication with the nozzle chamber;
  an actuator that is displaceable, in a substantially rectilinear manner, with respect to the substrate;
  an ink-ejecting mechanism that is angularly displaceable with respect to the substrate to eject ink from the ink ejection port; and
  a translation to rotation conversion mechanism interposed between the actuator and the ink-ejecting mechanism to convert rectilinear movement of the actuator into angular displacement of the ink-ejecting mechanism.

The ink-ejecting mechanism may include an ink ejection member that is positioned in the nozzle chamber and is angularly displaceable with respect to the substrate to eject ink from the ink ejection port.

The actuator may have a fixed portion that is fixed to the substrate and a working portion that is capable of thermal expansion when heated to be displaced in said substantially rectilinear manner.

The translation to rotation conversion mechanism may include a pivot member that is pivotal with respect to the substrate. The pivot member may be connected to the working portion of the thermal actuator to pivot upon displacement of the working portion. The ink ejection member may be connected to the pivot member so that the ink ejection member is angularly displaced upon expansion of the working portion.

The nozzle chamber walls and the roof may be dimensioned so that the nozzle chamber is elongate and has a generally rectangular shape when viewed in plan. The nozzle chamber walls may thus include a distal end wall, a proximal end wall and a pair of opposed side walls, the pivot member being positioned adjacent the proximal end wall and the ink ejection port being positioned adjacent the distal end wall.

Each ink ejection member may be shaped to correspond generally with a plan profile of each nozzle chamber so that an end of the ink ejection member is positioned adjacent the ink ejection port.

Each pivot member and each ink ejection member may be configured so that the ink ejection member is between approximately 20 and 60 times longer than an effective lever arm defined by the pivot member. In particular, each ink ejection member may be approximately 40 times longer than the effective lever arm defined by the pivot member.

In a particular embodiment, the ink ejecting mechanism may be in the form of an active ink-ejecting structure. The active ink-ejecting structure may at least partially define the nozzle chamber and the roof that defines the ink ejection port that is in fluid communication with the nozzle chamber. The active ink-ejecting structure may be pivotally connected to the substrate. The actuator may be connected to the active ink-ejecting structure so that the active ink-ejecting structure is angularly displaced with respect to the substrate upon displacement of the actuator, to eject ink from the ink ejection port.

The printhead chip may be the product of an integrated circuit fabrication technique. The substrate may include a silicon wafer substrate and a CMOS layer positioned on the silicon wafer substrate, the CMOS layer being connected to the actuator of each nozzle arrangement to provide the actuator with electrical driving pulses.

The substrate may have a plurality of ink inlet channels defined therein, one inlet channel opening into each respective nozzle chamber.

The invention extends to an inkjet printhead that includes at least one printhead chip as described above.

The invention is now described, by way of examples, with reference to the accompanying drawings. The following description is not intended to limit the broad scope of the above summary.

DETAILED DESCRIPTION OF THE INVENTION

Figure 1:
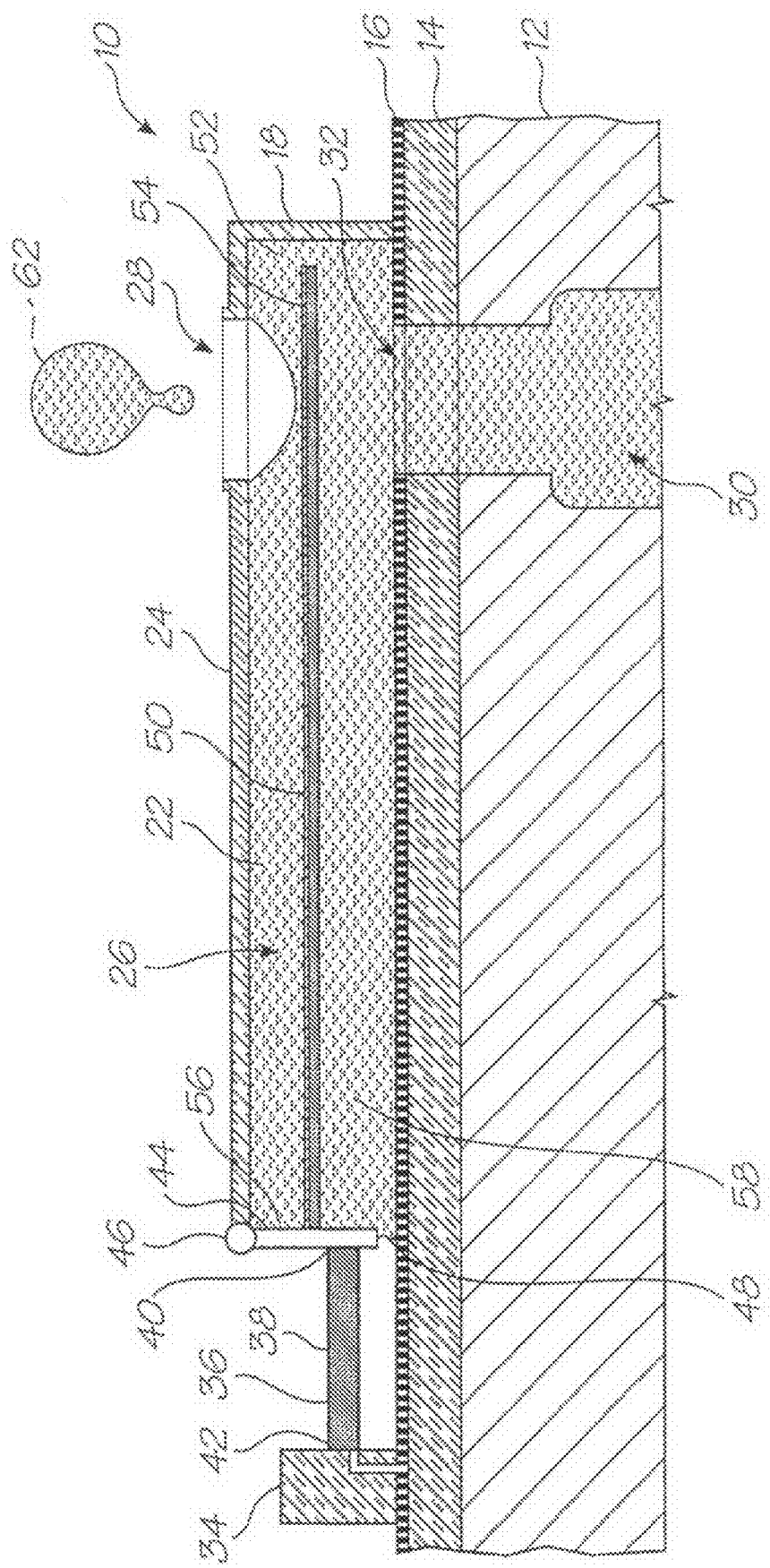
FIG. 1 shows a schematic sectioned side view of a nozzle arrangement of a first embodiment of a printhead chip, in accordance with the invention, for an inkjet printhead, in a quiescent condition.
Figure 2:
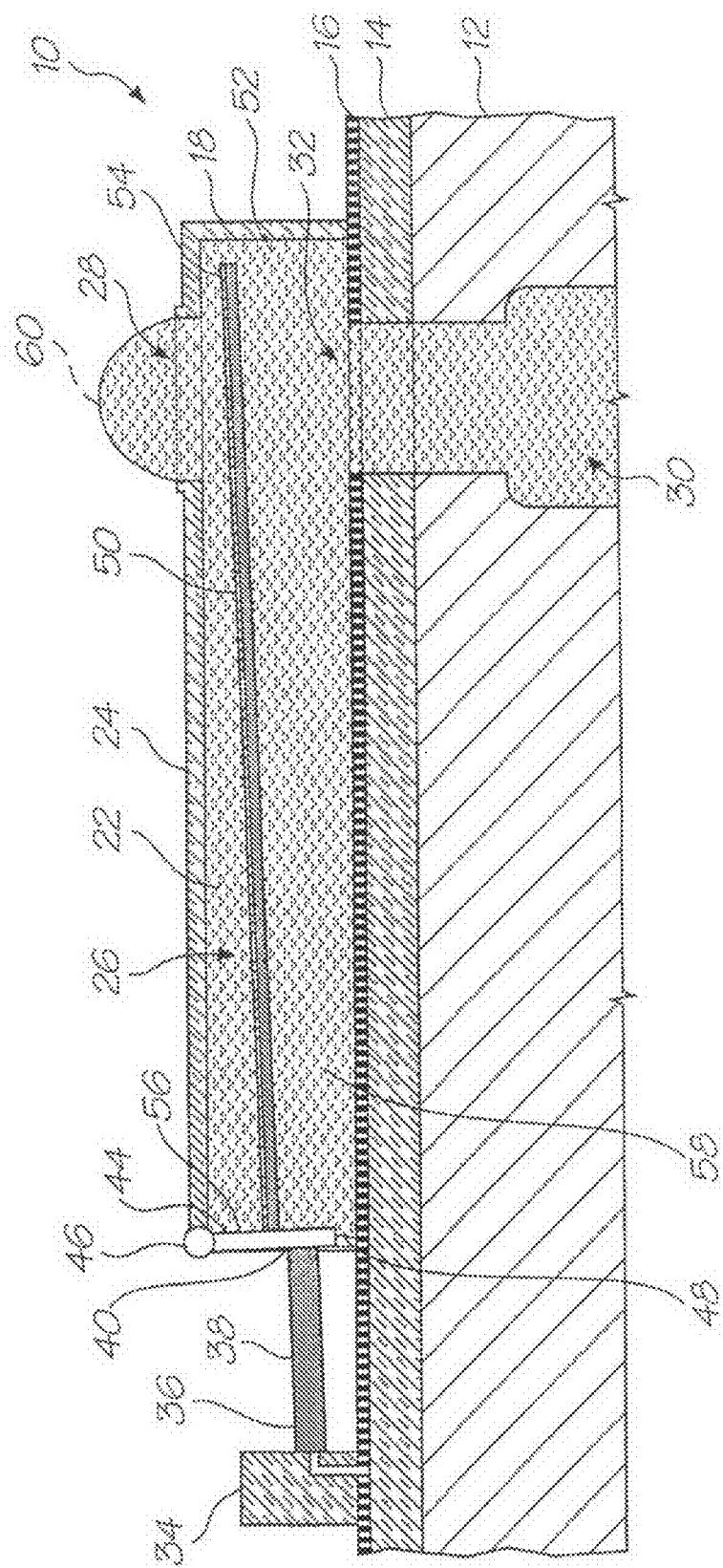
FIG. 2 shows a schematic sectioned side view of the nozzle arrangement of FIG. 1.
Figure 3:
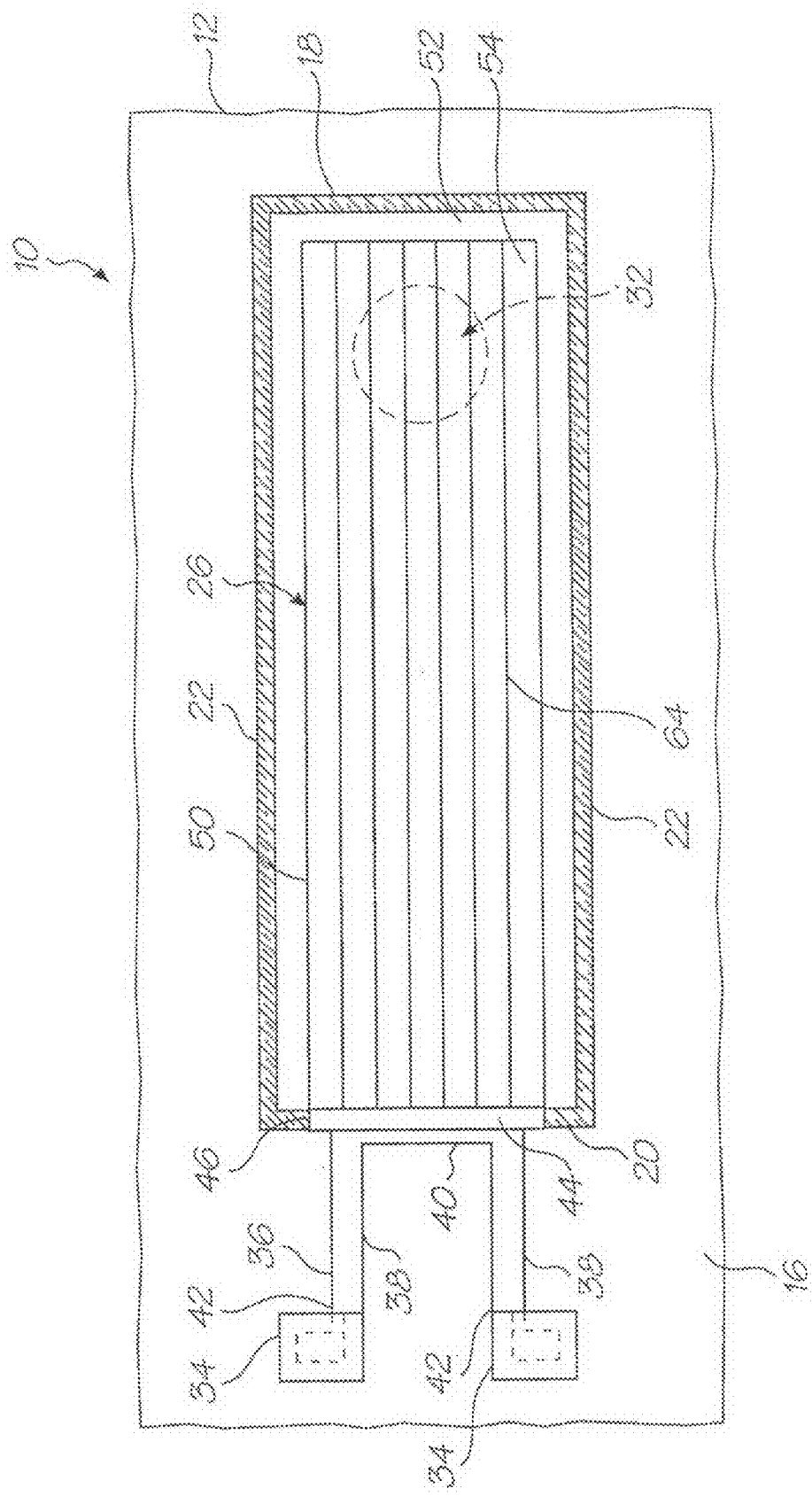
FIG. 3 shows a schematic plan view of the nozzle arrangement of FIG. 1.

In FIGS. 1 to 3, reference numeral 10 generally indicates a nozzle arrangement for a first embodiment of an ink jet printhead chip, in accordance with the invention.

The nozzle arrangement 10 is one of a plurality of such nozzle arrangements formed on a silicon wafer substrate 12 to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 10 on the wafer substrate 12.

The printhead chip is the product of an integrated circuit fabrication technique. In particular, each nozzle arrangement 10 is the product of a MEMS—based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 10.

An electrical drive circuitry layer 14 is positioned on the silicon wafer substrate 12. The electrical drive circuitry layer 14 includes CMOS drive circuitry. The particular configuration of the CMOS drive circuitry is not important to this description and has therefore been shown schematically in the drawings. Suffice to say that it is connected to a suitable microprocessor and provides electrical current to the nozzle arrangement 10 upon receipt of an enabling signal from said suitable microprocessor. An example of a suitable microprocessor is described in the above referenced patents/patent applications. It follows that this level of detail will not be set out in this specification.

An ink passivation layer 16 is positioned on the drive circuitry layer 14. The ink passivation layer 16 can be of any suitable material, such as silicon nitride.

The nozzle arrangement 10 includes nozzle chamber walls in the form of a distal end wall 18, a proximal end wall 20 and a pair of opposed sidewalls 22. A roof 24 spans the walls 18, 20, 22. The roof 24 and the walls 18, 20, 22 define a nozzle chamber 26. The roof 24 defines an ink ejection port 28 in fluid communication with the nozzle chamber 26. The walls 18, 20, 22 and the roof 24 are dimensioned so that the nozzle chamber 26 has a rectangular shape when viewed in plan. The ink ejection port 28 is positioned adjacent a distal end 52 of the nozzle chamber 26.

A plurality of ink inlet channels 30 is defined through the substrate 12 and the layers 14, 16. Each ink inlet channel 30 is in fluid communication with a respective nozzle chamber 26. Further, an opening 32 of each ink inlet channel 30 is aligned with the ink ejection port 28 of its associated nozzle chamber 26.

An anchor formation in the form of a pair of anchors 34 is fast with the substrate 12 on a proximal side of the nozzle chamber 26. An actuator in the form of an electro thermal expansion actuator 36 is fast with the anchor 34 and extends towards the proximal end wall 20. The thermal expansion actuator 36 is of a conductive material and is shaped to define an electrical heating circuit. The actuator 36 is of a material that has a coefficient of thermal expansion that is such that, when heated and subsequently cooled, expansion and contraction of the material can be harnessed to perform work on a MEMS scale. An example of a suitable material is Aluminum Titanium Nitride. In particular, the thermal expansion actuator 36 has a pair of arms 38 that are interconnected by a bridge portion 40. The actuator 36 has a fixed portion defined by fixed ends 42 of the arms 38 that are fast with respective anchors 34.

Each of the anchors 34 are configured to provide electrical connection between the fixed ends 42 and the electrical drive circuitry layer 14. In particular, the anchors 34 are configured to provide electrical connection between one fixed end 42 and a negative contact and the other fixed end 42 and a positive contact. The electrical drive circuitry layer 14 is connected to a microprocessor of the type described in the above referenced patents/applications so that electrical current pulses of suitable shape and magnitude can be supplied to the actuator 36.

The bridge portion 40 of the actuator 36 defines a working portion of the actuator 36.

The nozzle arrangement 10 includes a pivot member 44 that is pivotally arranged on the proximal end wall 20. The bridge portion 40 of the actuator 36 is connected to the pivot member at a position intermediate a pivot point, indicated at 46, defined by the pivot member 44 and the proximal end wall 20. It is to be understood that the pivot point 46 can be defined by any number of configurations of the pivot member 44 and the proximal end wall 20. For this reason, the pivot point 46 is indicated schematically only. In one possible embodiment, the proximal end wall 20 could define the pivot member 44. In this case, the pivot point 46 would be defined between the proximal end wall 20 and the sidewalls 22. In particular, this would entail hingedly connecting the proximal end wall 20 to the sidewalls 22.

It will be appreciated that, in any event, the pivot member 44 is to form part of the proximal end wall 20. Thus, a sealing member 48 is provided intermediate the pivot member 44 and the ink passivation layer 16. The sealing member 48 is configured to accommodate pivotal movement of the pivot member 44 upon expansion and subsequent contraction of the thermal expansion actuator 36.

The nozzle arrangement 10 includes an ink ejection member in the form of a paddle 50. The paddle 50 is dimensioned to correspond generally with the nozzle chamber 26. In particular, the paddle 50 is dimensioned so that an end portion 54 of the paddle 50 is positioned intermediate the ink ejection port 28 and the opening 32 of the ink inlet channel 30.

The paddle 50 and the pivot member 44 are configured so that the paddle 50 is approximately 40 times longer than an effective lever arm, indicated at 56, defined by the paddle 50 and the pivot member 44. It should be noted that the lever arm 56 is only shown schematically because of the wide variety of different possible configurations available for defining the lever arm 56. Further, a ratio of paddle length to lever arm length can vary widely from the 40:1 ratio. This could depend on a number of factors such as driving signal strength and actuator material.

It will be appreciated that a maximum extent of movement of the paddle 50 takes place at the end portion 54 of the paddle 50. Furthermore, this extent of movement is up to 40 times greater than a range of movement of the effective lever arm 56. It follows that the expansion of the thermal actuator 36 is substantially amplified at the end portion 54, therefore facilitating the ejection of ink 58 from the ink ejection port 28 as indicated at 60 in FIG. 2. When the actuator 36 cools, subsequent contraction of the actuator 36 causes an amplified extent of movement of the end portion 54 back into a quiescent position shown in FIG. 1. This results in separation of the ink 60 from the ink 58 to form an ink drop 62.

The paddle 50 includes reinforcing ribs 64 to strengthen the paddle 50. This is necessary due to the relative length of the paddle 50 and a resultant bending moment exerted on the paddle 50.

It will be appreciated that, in light of the above referenced applications and patents, the nozzle arrangement 10 is suited for fabrication with an integrated circuit fabrication technique. Furthermore, the pivot member 44 and pivot point 46 can be defined by any number of micro mechanical arrangements. For example, a flexible member may be formed intermediate the pivot member 44 and the sidewalls 22 or proximal end wall 20 that is distorted to accommodate pivotal movement of the pivot member 44.

Figure 4:
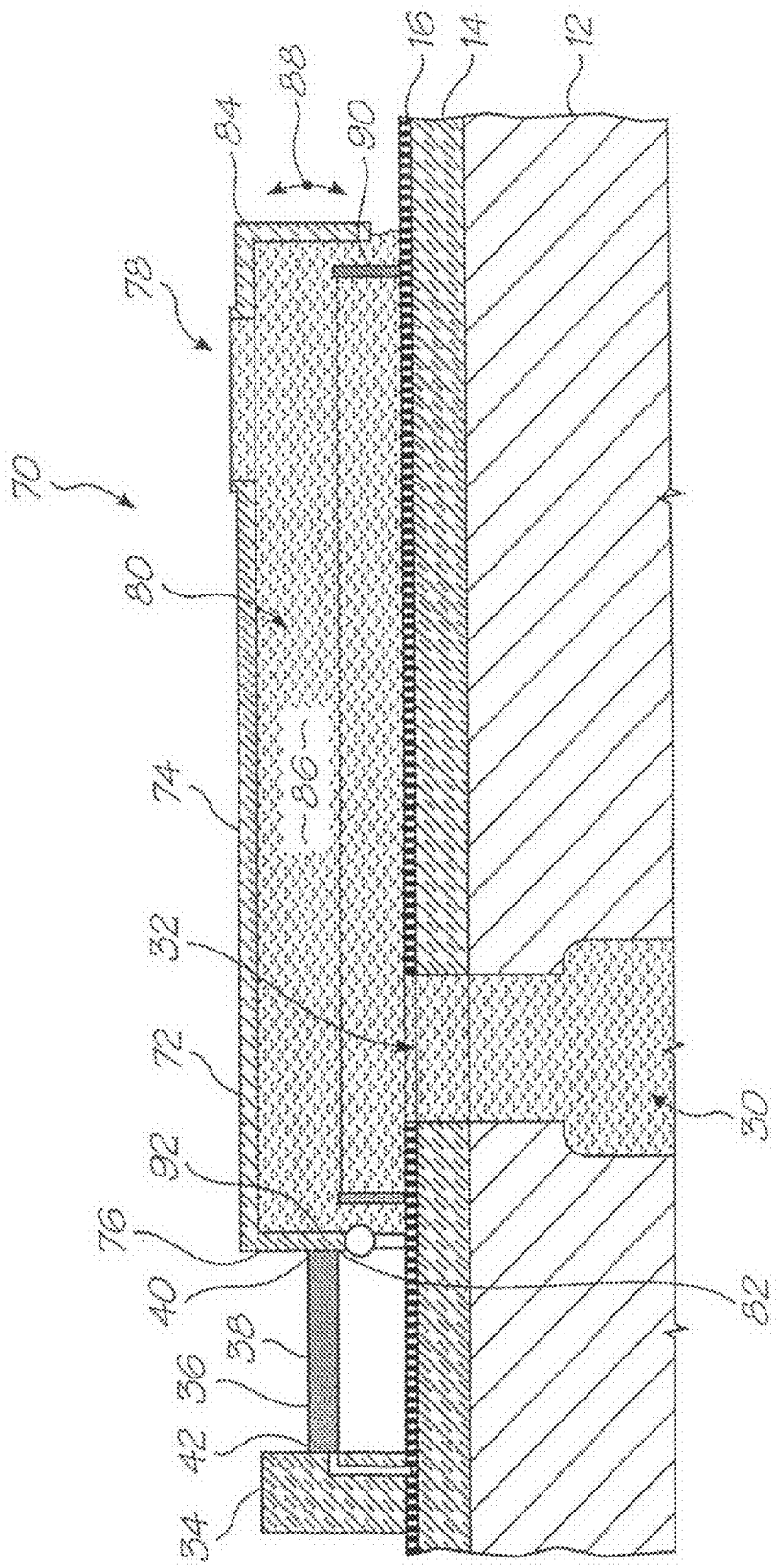
FIG. 4 shows a schematic sectioned side view of a nozzle arrangement of a second embodiment of a printhead chip, in accordance with the invention, for an ink jet printhead.

In FIG. 4, reference numeral 70 generally indicates a nozzle arrangement of a second embodiment of a printhead chip, in accordance with the invention, for an inkjet printhead. With reference to FIGS. 1 to 3, like reference numerals refer to like parts, unless otherwise specified.

The nozzle arrangement 70 includes an active ink-ejecting structure 72. The active ink-ejecting structure 72 has a roof 74 and walls 76 that extend from the roof 74 towards the substrate 12. The roof 74 defines an ink ejection port 78. The roof 74 and the walls 76 together define a nozzle chamber 80.

The walls 76 comprise a proximal end wall 82, an opposed distal end wall 84 and a pair of opposed sidewalls 86. The ink ejection port 78 is positioned adjacent the distal end wall 84, while the opening 32 of the ink inlet channel 30 is positioned adjacent the proximal end wall 82.

The proximal end wall 82 is pivotally mounted on the substrate 12 so that the active ink-ejecting structure 72 is pivotal with respect to the substrate 12. In particular, the active ink-ejecting structure 72 is pivotal in the direction of an arrow 88 to an extent that is sufficient to facilitate the ejection of ink from the ink ejection port 78.

The roof 74 and the walls 76 are dimensioned so that the nozzle chamber 80 is rectangular and has a length that is more than 3 times a height of the nozzle chamber 80. This, together with the fact that the ink ejection port 78 and the opening 32 are positioned at opposite ends of the nozzle chamber 80 facilitates the retardation of ink flow from the ink ejection port 78 towards the opening 32 when the structure 72 is pivotally displaced towards the substrate 12. This flow is referred to as backflow and is highly undesirable.

The bridge portion 40 of the actuator 36 is fixed to the proximal end wall 82. Thus, on heating and subsequent expansion of the actuator 36 in the manner described above, the ink-ejecting structure 72 is pivoted towards the substrate 12. Upon cooling and subsequent contraction of the actuator 36 in the manner described above, the ink-ejecting structure 72 is pivoted away from the substrate 12. This reciprocal movement of the ink-ejecting structure 72 results in the ejection of an ink drop from the ink ejection port 28.

The bridge portion 40 is connected to the proximal end wall 82 at a position in which a length of the ink-ejecting structure 72 is up to 40 times greater than a length of an effective lever arm, indicated at 92. It follows that pivotal movement of the effective lever arm 92 as a result of displacement of the bridge portion 40 upon heating and subsequent cooling of the actuator 36 can be amplified by a factor as high as 40. It has been found by the Applicant that this facilitates efficient ink drop ejection.

The nozzle arrangement 70 includes a sealing structure 90 that extends from the ink passivation layer 16. The walls 76 overlap the sealing structure 90 so that a fluidic seal is defined between the sealing structure 90 and the walls 76 when the nozzle chamber 80 is filled with ink.

Applicant believes that this invention provides a means whereby simple thermal expansion and contraction, in a rectilinear manner, can be converted into useful work by converting the motion into amplified pivotal motion.

I claim:

1. An inkjet printhead comprising:
   a plurality of nozzle arrangements each having:
   a nozzle chamber with an ink ejection port that is in fluid communication with the nozzle chamber,
   an actuator configured for rectilinear movement,
   an ink-ejecting mechanism configured for angular displacement to eject ink from the ink ejection port and
   a translation to rotation conversion mechanism interposed between the actuator and the ink-ejecting mechanism to convert rectilinear movement of the actuator into angular displacement of the ink-ejecting mechanism.

2. An inkjet printhead as claimed in claim 1, in which the ink-ejecting mechanism includes an ink ejection member that is positioned in the nozzle chamber.

3. An inkjet printhead as claimed in claim 1, further comprising a supporting substrate for the plurality of nozzle arrangements wherein the ink ejecting mechanism is in the form of an active ink-ejecting structure that at least partially defines the nozzle chamber and the ink ejection port that is in fluid communication with the nozzle chamber, the active ink-ejecting structure being pivotally connected to the substrate, the actuator being connected to the active ink-ejecting structure so that the active ink-ejecting structure is angularly displaced with respect to the substrate upon displacement of the actuator, to eject ink from the ink ejection port.

4. An inkjet printhead as claimed in claim 1, further comprising a supporting substrate for the plurality of nozzle arrangements wherein the substrate has a plurality of ink inlet channels defined therein, one inlet channel opening into each respective nozzle chamber.

5. An inkjet printhead as claimed in claim 2, further comprising a supporting substrate for the plurality of nozzle chambers wherein the actuator has a fixed portion that is fixed to the substrate and a working portion that is capable of thermal expansion when heated to be displaced in said substantially rectilinear manner.

6. An inkjet printhead as claimed in claim 5, in which the translation to rotation conversion mechanism includes a pivot member that is pivotal with respect to the substrate, the pivot member being connected to the working portion of the thermal actuator to pivot upon displacement of the working portion, the ink ejection member being connected to the pivot member so that the ink ejection member is angularly displaced upon expansion of the working portion.

7. An inkjet printhead as claimed in claim 5, further comprising a CMOS layer wherein the substrate includes a silicon wafer substrate and the CMOS layer is positioned on the silicon wafer substrate, the CMOS layer being connected to the actuator of each nozzle arrangement to provide the actuator with electrical driving pulses.

8. An inkjet printhead as claimed in claim 6, wherein each of the nozzle chambers has chamber walls and a roof in which the ejection port is defined, the chamber walls and the roof being dimensioned so that the nozzle chamber is elongate and has a generally rectangular shape when viewed in plan, so that the nozzle chamber walls include a distal end wall, a proximal end wall and a pair of opposed side walls, the pivot member being positioned adjacent the proximal end wall and the ink ejection port being positioned adjacent the distal end wall.

9. An inkjet printhead as claimed in claim 8, in which each ink ejection member is shaped to correspond generally with a plan profile of each nozzle chamber so that an end of the ink ejection member is positioned adjacent the ink ejection port.

10. An inkjet printhead as claimed in claim 9, in which each pivot member and each ink ejection member are configured so that the ink ejection member is between approximately 20 and 60 times longer than an effective lever arm defined by the pivot member.

11. An inkjet printhead as claimed in claim 10, in which each ink ejection member is approximately 40 times longer than the effective lever arm defined by the pivot member.

* * * * *